(12) United States Patent
Yuan et al.

(10) Patent No.: US 10,657,783 B2
(45) Date of Patent: May 19, 2020

(54) VIDEO SURVEILLANCE METHOD BASED ON OBJECT DETECTION AND SYSTEM THEREOF

(71) Applicant: Hangzhou Eyecloud Technologies Co., Ltd., Hangzhou, Zhejiang (CN)

(72) Inventors: Po Yuan, San Jose, CA (US); Shengjun Pan, Pengzhou (CN); Junneng Zhao, Hangzhou (CN); Daniel Mariniuc, Timis (RO)

(73) Assignee: Hangzhou Eyecloud Technologies Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/238,487

(22) Filed: Jan. 2, 2019

(65) Prior Publication Data

US 2020/0005613 A1    Jan. 2, 2020

Related U.S. Application Data

(63) Continuation-in-part of application No. 16/078,253, filed as application No. PCT/CN2018/093697 on Jun. 29, 2018.

(51) Int. Cl.
*H04N 5/00* (2011.01)
*G08B 13/196* (2006.01)
(Continued)

(52) U.S. Cl.
CPC ... *G08B 13/19613* (2013.01); *G06K 9/00362* (2013.01); *G06K 9/00536* (2013.01);
(Continued)

(58) Field of Classification Search
CPC ....... G08B 13/19613; H04N 5/232411; H04N 7/185; G06N 20/00; G06N 3/08; G06K 9/00362; G06K 9/00536
See application file for complete search history.

(56) References Cited

U.S. PATENT DOCUMENTS

2006/0095199 A1*  5/2006  Lagassey .............. G07C 5/008
                                                          701/117
2019/0220743 A1*  7/2019  Chabanne ............ G06K 9/6267

OTHER PUBLICATIONS

Howard et al. "MobileNets: Efficient Convolutional Neural Networks for Mobile Vision Applications". Apr. 2017. (Year: 2017).*
(Continued)

*Primary Examiner* — Zhihan Zhou
(74) *Attorney, Agent, or Firm* — Raymond Y. Chan; David and Raymond Patent Firm

(57) ABSTRACT

A video surveillance method includes the steps of detecting, by a motion detector, an object motion, in the field of view of a surveillance device when the surveillance device is in a standby mode; generating, responsive to a positive detection to switch the surveillance device from the standby mode to an operation mode, one or more images of the moving object; determining, by processing the one or more images with a deep neural network (DNN) model of an object detector, whether the objects contained in the one or more images belong to a given categories, wherein the DNN model comprises N (N is a positive integer and ranged from 4-12) depthwise separable convolution layers; and video recording, responsive to a positive determination, the moving object in the field of view of the surveillance device.

12 Claims, 4 Drawing Sheets

(51) Int. Cl.
*H04N 7/18* (2006.01)
*G06K 9/00* (2006.01)
*H04N 5/232* (2006.01)
*G06N 3/08* (2006.01)
*G06N 20/00* (2019.01)

(52) U.S. Cl.
CPC .............. *G06N 3/08* (2013.01); *G06N 20/00* (2019.01); *H04N 5/232411* (2018.08); *H04N 7/185* (2013.01)

(56) References Cited

OTHER PUBLICATIONS

Nikouei et al. "Real-Time Human Detection as an Edge Service Enabled by a Lightweight CNN". Apr. 2018. (Year: 2018).*

* cited by examiner

VIDEO SURVEILLANCE METHOD BASED ON OBJECT DETECTION AND SYSTEM THEREOF

CROSS REFERENCE OF RELATED APPLICATION

This is a Continuation-In-Part application that claims the benefit of priority under 35 U.S.C. § 120 to a non-provisional application, U.S. application Ser. No. 16/078,253 filed Date Aug. 21, 2018 which is a U.S. National Stage under 35 U.S.C. 371 of the International Application Number PCT/CN2018/093697 filed Date Jun. 29, 2018. This is also a non-provisional application that claims the benefit of priority under 35 U.S.C. § 119 (A-D) to a Chinese patent application, application number 2018114026950.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to security surveillance system, and more particular to a video surveillance method based on object detection and system thereof which is capable of intelligently turning the video surveillance function of a surveillance device based on a detection, performed by an object detector integrated in the surveillance device, of the objects contained in the images collected by the surveillance device belonging to a given categories, such that false detections and alerts are significantly filtered and the power-consumption of the surveillance device is reduced as well.

Description of Related Arts

Security surveillance system plays an increasingly important role in protecting human's manufacture and life. Currently, most video surveillance systems are motion-triggered that the function of video surveillance is triggered on when a presence of object motion is detected. However, such video surveillance systems encounter many shortcomings in practical applications.

First, for the motion-triggered video surveillance system, any object with moving ability is able to trigger the motion detector and registered users will be alerted of detecting a potential intruder. Such system is subject to many false detections or false alarms, since it is unable to distinguish whether object detected in the field of view is a desired object or not. For example, when a dog or cat interrupts into the monitoring areas of the video surveillance system, it will also trigger the motion detector and generate alert signals to notify the registered users, causing great annoyances for the users.

Moreover, when too many of these false detections and alerts occur, the registered users will get less sensitive to the alerts and the user may even lose interest when an actual intruder is detected in the video surveillance system, causing personal safety and property in danger. Meanwhile, each false detection and video recording and transmission costs a certain amount of power. Therefore, the conventional motion-triggered video surveillance system suffers from excessive power-consumption.

In recent years, artificial intelligence technology has been introduced into the video surveillance system in order to solve the defects of too many false detection and alerts due to lack of the object detection capability. The common practice is to build the object recognition algorithm on a server (either a local server or a cloud server) to detect whether an object of a given categories, such as human beings, is contained in the video recorded and to generate an alert signal to notify the registered users when the object of the given categories is detected, so as to reduce the incidence of false detection.

Equipped with AI technology, the video surveillance system is capable of distinguishing the object of a given categories so as to reduce the incidence of false detection. However, the problem of high power consumption has not been solved yet. Rather, it gets worse to some extent, for the reason that the procedures of video recording and transmission to the cloud server for object detection consumes extra power. On the other hand, such video surveillance system introduces a certain delay in notifying the registered users, since both the processes of detecting the object contained in the recorded video on the server and video recording and transmission to the server take a certain amount of time.

Consequently, there is an urgent desire for a video surveillance system that has lower power consumption and reduced false detection.

SUMMARY OF THE PRESENT INVENTION

The invention is advantageous in that it provides a video surveillance method based on object detection and system thereof which is capable of intelligently turning on the video surveillance function of a surveillance device based on a detection, performed by an object detector integrated in the surveillance device, of the objects contained in the images collected by the surveillance device belonging to a given categories, such that false detections and alerts are significantly filtered and the power-consumption thereof is reduced as well.

According to one aspect of the present invention, it provides a video surveillance method which comprises the following steps.

Detect, by a motion detector, an object motion, in the field of view of a surveillance device when the surveillance device is in a standby mode.

Generate, responsive to a positive detection to switch the surveillance device from the standby mode to an operation mode, one or more images of the moving object by the surveillance device.

Determine, by processing the one or more images with a deep neural network (DNN) model of an object detector, whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images.

Video record, responsive to a positive determination, the moving object in the field of view of the surveillance device.

In one embodiment of the present invention, the video surveillance system further comprises a step of generating an alert responsive to a positive determination.

In one embodiment of the present invention, the object detector is integrated in the surveillance device.

In one embodiment of the present invention, the step of determining whether the objects contained in the one or more images belong to a given categories, comprises the following steps.

Identify different image regions between a first and a second image of the one or more images.

Group the different image regions between the first image and the second image into one or more regions of interest (ROIs).

Transform the one or more ROIs into grayscale;

Classify, by processing the grayscale ROIs with a deep neural network (DNN) model, the objects contained in the one or more ROIs.

Determine whether the objects contained in the one or more ROIs belong to the given categories.

In one embodiment of the present invention, prior to identifying different image regions between a first and a second image of the one or more images, the method further comprises a step of transforming the second image to compensate for the physical movement of the surveillance device when capturing the first image and the second image.

In one embodiment of the present invention, the video surveillance method further comprises a step of outputting the video recorded by the surveillance device.

In one embodiment of the present invention, the video surveillance method further comprises a step of receiving a control signal to selectively switch the surveillance device between the standby mode and the operation mode.

In one embodiment of the present invention, the step of determining whether the objects contained in the one or more images belong to a given categories, further comprises the following steps.

Determine whether the objects contained in the one or more images belong to particular objects of the given categories, wherein the DNN model of the object detector is trained to recognize particular objects of the given categories.

In one embodiment of the present invention, the given categories are set as human beings.

According to another aspect of the present invention, it further provides a video surveillance system based on object detection, comprising:

a motion detector for detecting an object motion in the field of view of a surveillance device when the surveillance device is in a standby mode;

a mode switcher for switching, responsive to a positive detection, the surveillance device from the standby mode to an operation mode, wherein in the operation mode, one or more images of the moving object are generated by the surveillance device;

an object detector for processing the one or more images with deep neural network (DNN) model of an object detector to determine whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images; and a video recorder for video recording, responsive to a positive determination, the moving object in the field of view of the surveillance device.

In one embodiment of the present invention, the video recorder is further configured for generating an alert responsive to a positive determination In one embodiment of the present invention, wherein the object detector is further configured for:

identifying different image regions between a first and a second image of the one or more images;

grouping the different image regions between the first image and the second image into one or more regions of interest (ROIs);

transforming the one or more ROIs into grayscale;

classifying, by processing the grayscale ROIs with a deep neural network (DNN) model, the objects contained in the one or more ROIs; and determining whether the objects contained in the one or more ROIs belong to a given categories.

In one embodiment of the present invention, the object detector is further configured for, prior to identifying different image regions between a first and a second image of the one or more images, transforming the second image to compensate for the physical movement of the surveillance device when capturing the first image and the second image.

In one embodiment of the present invention, the video recorder is further configured for outputting the recorded video.

In one embodiment of the present invention, the mode switcher is further configured for receiving a control signal to selectively switch the surveillance device between the standby mode and the operation mode.

In one embodiment of the present invention, the DNN model of the object detector is trained to recognize particular objects of the given categories, and the object detector is further configured to determine whether the objects contained in the one or more images belong to particular objects of the given categories.

In one embodiment of the present invention, the given categories are set as human beings In one embodiment of the present invention, the video surveillance system further comprises a client system for receiving the video recorded by the video recorder.

In one embodiment of the present invention, the client system is capable of generating a control signal for selectively switching the surveillance device between the standby mode and the operation mode.

According to another aspect of the present invention, it further provides a computer program product, comprising one or more computer-readable storage device and program instructions stored on the computer-readable storage device, wherein the stored program instructions comprising:

program instructions to detect an object motion in the field of view of a surveillance device when the surveillance device is in a standby mode;

program instructions to generate, responsive to a positive detection to switch the surveillance device from the standby mode to an operation mode, one or more images of the moving object;

program instructions to determine, by processing the one or more images with deep neural network (DNN) model of an object detector, whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images; and program instructions to video record, responsive to a positive determination, the moving object in the field of view of the surveillance device.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
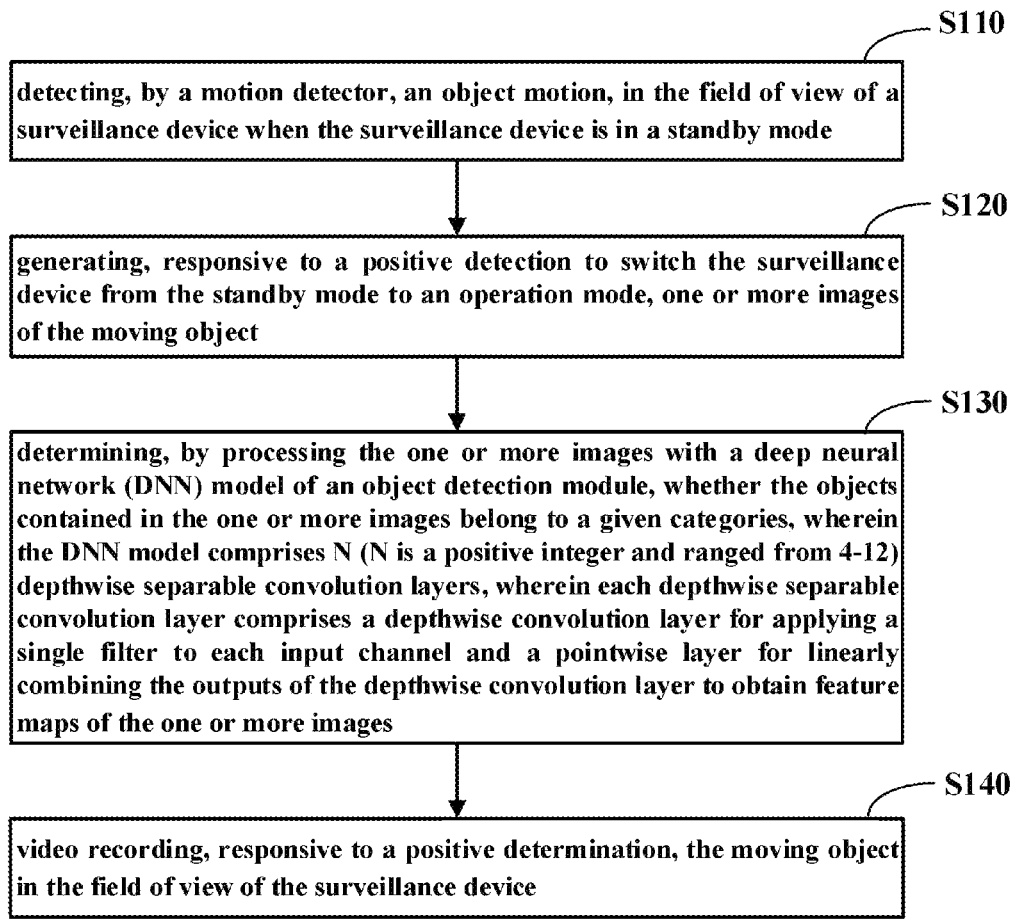
FIG. 1 is a flow diagram of a video surveillance method based on object detection according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

As mentioned above, the security surveillance system serves as an indispensable barrier in protecting human's manufacture and life. The video surveillance system has evolved from the conventional motion-triggered type to the modern sophisticated type which utilizes artificial intelligence technology for improving its performance. Though, the modern video surveillance system, equipped with AI technology, has the capability of object detection to reduce the incidence of false detection, it still encounters many shortcomings in its applications.

First, the problem of high power consumption has not been solved yet. Rather, it even gets severe to some extent. More specifically, the server, on which the artificial intelligence algorithm for object detection is deployed, is separately and remotely constructed, such that the recorded video as row material for object detection must be transmitted to the server. The process of video recording and transmission to the server did consume a certain amount of extra power.

Second, artificial intelligence for object detection is a computationally intensive task. In other words, it would take a certain amount of time to complete the object detection for the recorded videos. Therefore, such surveillance system has a poor real-time performance.

In addition, most artificial intelligence algorithms for object detection and recognition mainly focus on achieving higher accuracy with deeper and more complicated networks. However, it is well known that image processing is a computation-intensive task. The huge computational cost caused by the improvement of the accuracy would lead to high latency, which is not conducive to implementations of neural network model in embedded terminal products such as surveillance devices. As to the surveillance devices, the object detection algorithm is deadly required to be low-latency and low power-consumption, while having an accuracy within an acceptable range.

In view of the above technical problems, a basic idea of the present invention is emerged that firstly constructing a neural network model for object detection which is suitable for embedded platform applications and deploying the DNN model on the surveillance device. The DNN model for object detection is arranged for classifying the objects contained in the videos or images collected by the surveillance device and determining whether the detected objects belong to a given categories. In responsive to the determination, the video recording function of the surveillance device is turned on or off intelligently, while generating alert signals to notify register users of the surveillance device.

Based on the basic idea of present invention, the present invention provides a video surveillance method based on object detection and system thereof, wherein the video surveillance method based object detection comprises the steps:

detecting, by a motion detector, an object motion, in the field of view of a surveillance device when the surveillance device is in a standby mode;

generating, responsive to a positive detection to switch the surveillance device from the standby mode to an operation mode, one or more images of the moving object by the surveillance device;

determining, by processing the one or more images with a deep neural network (DNN) model of an object detector, whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images; and video recording, responsive to a positive determination, the moving object in the field of view of the surveillance device.

As such, the video surveillance function of the surveillance device is intelligently turned on based on a detection, performed by an object detector integrated with the surveillance device, of the objects contained in the images collected by the surveillance device belonging to a given categories, such that false detections and alerts are significantly filtered and the power-consumption thereof is reduced as well.

Illustrative Video Surveillance Method Based on Object Detection

Referring to FIG. 1 of the drawings, a video surveillance method based object detection according to a preferred embodiment is illustrated, wherein the video surveillance method comprises the steps of: S110, detecting, by a motion detector, an object motion, in the field of view of a surveillance device, when the surveillance device is in a standby mode; S120, generating, responsive to a positive detection to switch the surveillance device from the standby mode to an operation mode, one or more images of the moving object by the surveillance device; S130, determining, by processing the one or more images with a deep neural network (DNN) model of an object detector, whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images; and S140, video recording, responsive to a positive determination, the moving object in the field of view of the surveillance device.

In step S110, the surveillance device is set in the standby mode that a motion detector is arranged to detect a motion in the field of view of the surveillance device. It should be noted that the standby mode of the surveillance device in the present invention refers to a state that the video recording function of the surveillance device is turned off. In other words, the surveillance device does not perform the function of video recording the scene in the field of view thereof in its standby mode, such that the power consumed by the surveillance device in the standby mode is relative low.

More specifically, when the surveillance device is in the standby mode, the motion detector aligning with the field of view of the surveillance device is activated on to detect whether there is an object motion existing in the field of view of the surveillance device. It is worth mentioning that in the security surveillance field, the objects of interest to be detected (namely potential intruders) are commonly the objects having moving ability (such as humans, animals and vehicles) rather than stationary objects (such as the background of the scene where the surveillance device is located). Therefore, with the motion detector, the surveillance device is capable of roughly detecting whether there is a potential intruder interrupting in the field of view thereof.

For ease of better description and understanding, the detection phrase conducted by the motion detector is defined as a preliminary detection phrase. In other words, when the video surveillance system is in the preliminary detection phrase, the video recording function of the surveillance device is turned off, while the motion detector is on its operation state to detect an object motion in the field of view of the surveillance device for initially detecting whether there is a potential intruder in the field of view of the surveillance device. It is appreciated that in the preliminary detection phrase, the motion detector is merely able to detect the presence of a moving object in the field of view of the surveillance device, but unable to further specify the category that the moving object belongs to determine whether the moving object is a potential intruder of high likelihood or not. However, the detection result acquired from the preliminary detection phrase provides a good basis for determining whether to enable the video recording function of the monitoring device or not.

In the implementation, the motion detector may be integrated in the surveillance device as an integral component thereof, or embodied as a separated device mounted adjacent to the surveillance device for detecting an object motion in the field of view of the surveillance device, which is not a limitation in the present invention.

In step S120, the surveillance device is converted to an operation mode from the standby mode in response to a positive detection that an object motion is present in the field of view of the surveillance device. On the operation mode, the surveillance device captures one or more images of the moving object within the field of view thereof. In other words, responsive to a positive detection that a moving object is detected in the field of view of the surveillance device, the mode of the surveillance device is shifted from the standby mode to operation mode to collect the one or more images of the moving object in the field of view of the surveillance device.

It is worth mentioning that when the surveillance device is in its operation mode, the video recording function is turned on temporarily. That means the surveillance device is unable to video record the scene in the field of view thereof directly in its operation mode. Instead, prior to deciding to turn on the video recording function continuously (keeping the video recording function on for a certain period of time), it is required to determine whether the objects contained in the one or more images collected by the surveillance device are of a give categories (namely potential intruder of high likelihood). As such, the incidences of false detections can be significantly minimized as well as the power consumption thereof.

In step 130, the one or more images, produced by the surveillance device in its operation mode, are processed with a deep neural network (DNN) of an object detector to determine whether the objects contained in the one or more images belong to a given categories. In the preferred embodiment of the present invention, The DNN model of the object detector comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images. In other words, the objects contained in the one or more images are classified by the object detector so as to determine whether the objects contained in the one or more images belong to a given categories.

In particular, the object detector is integrated in the surveillance device in the preferred embodiment of the present invention, i.e. being integrated on a processor of the surveillance device (such as a programmable logical chip). It is worth mentioning that since the object module is integrated in the surveillance device, the one or more images collected by the surveillance device can be directly transmitted to the object detector for object detecting and recognition with the object detection algorithm deployed therein. Compared with the conventional video surveillance system with AI technology as mentioned above, the one or more images generated by the surveillance device is not needed to transmitted to a cloud server for object detection, such that the time spending on the video transmission can be saved, thereby improving the time efficiency of the object detection. It is appreciated that when the one or more images include more than two images, the one or more images may also be referred as video data in a fixed time window.

In one embodiment of the present invention, the object detector may utilize the motion-based object detection method as disclosed in US application No. to process the one or more images to determine whether the objects contained in the one or more images belong to a given categories. In particular, the motion-based object detection method comprises the following steps.

First, a first and a second image of the one or more images are processed to extract one or more regions of the interest (ROIs) therefrom. In the image processing field, the region of interest (ROI) refers to an image segment which contains a candidate object of interest which belongs to a certain category.

In the implementation, a suitable method for extracting the region of interest (ROI) may be adopted based on the features of the scenario for which the object detection method is applied. In other words, the ROI extraction method is determined based on the scenario where the surveillance device is applied. Commonly, in the security surveillance field, the objects of interest to be detected are commonly the objects having moving ability (such as humans, animals and vehicles) rather than stationary objects (such as the scene background). Therefore, the ROIs may be obtained by identifying the moving parts in the images collected by surveillance equipment (such as surveillance cameras) in the security surveillance system.

From the perspective of image representation, the moving parts are the image segments having different image contents between images. Therefore, at least two images (the first image and the second image) are required in order to capture the moving parts in the images by a comparison between the first image and the second image. It is important to mention that the first and second images are taken under the same field of view for the same scene. In other words, the first and the second images have a common background, such that differences will be generated between the first image and the second image when a moving object intrudes in the scene monitored by the surveillance device. Then, the moving parts of the images (the differences between the first image and the second image) are clustered into larger ROIs. In other words, image segments with different image content between the first image and the second image are grouped to form the larger ROIs.

It is worth motioning that the first and the second images may be captured at a predetermined time interval by the surveillance device, such as 0.5 s. It is appreciated that the time interval between the first image and the second image can be set at any value in the present invention. For example, the first and the second images may be picked up from a video data (with a predetermined time window, such as 15 s) collected by the surveillance device and more particularly, the first and the second images may be two consecutive frames in the video data. In other words, the time interval of the first and the second image may be set as the frame rate of the video data.

Alternatively, the first image may be set as a standard image which purely contains the scene background itself, while the second image is a real-time image of the scene. Any moving objects can be identified by the comparison of the second image captured in real-time and the first image which merely includes the background of the scene. In other words, the first image remains as a reference, and the second image dynamically updates in real-time in such case.

It is important to mention that in the process of capturing the first and the second images by the video surveillance device, an unwanted movement (such as translation, rotation and scaling) may occur to the device itself, causing the backgrounds in the first and the second images offset with each other. Accordingly, effective methods should be taken to compensate for the physical movement of the device prior to identifying the moving parts in the first and second images. For example, the second image may be transformed to compensate for the unwanted physical movement based on the position data provided by a positioning sensor (i.e, gyroscope) integrated in the surveillance device. The purpose of the transformation of the second image is to align the background in the second image with that in the first image.

After being extracted by the motion-based ROI extracting method, the one or more ROIs which are less than an entirety of the first image or the second image are set as the input of a DNN model, such that the computational cost of the DNN model is significantly reduced from the source of the image to be detected. Moreover, since the motion-based ROI extracting method is designed based on the particular scenario for which the object detection method is applied, the candidate objects contained in the extracted ROIs are of high likelihood belonging to the given categories (objects having moving ability). In other words, adopting the motion-based ROI extracting method, the amount of data to be processed can be significantly reduced without damaging the ability of image representation.

Further, the one or more ROIs are transformed into grayscale. In other words, the one or more ROIs are grey processed to transform into grayscale format. Those who skilled in the art would know that most normal images are color images (in RGB format or YUV format) to fully represent the imaged object including illumination and color features. In contrast with grayscale image, color image has multiple channels (i.e. the R, G, B three channels) to store the color information of the imaged object. However, the color feature doesn't do much good in classifying the candidate objects contained in the ROIs, or even unnecessary in some applications. For example, when it is assumed that a given category object of interest is human beings in the security surveillance system, the skin color or the clothing color of the detected people is a misleading feature that should be filtered.

Therefore, the purpose of gray processing the ROIs is to filter the color information in the ROIs so as to not only reduce the computational cost of the DNN model but also to effectively prevent the color information adversely affecting object detection accuracy.

In order to further minimize the computational cost of the DNN model, the one or more ROIs may be scaled to particular sizes, i.e. 128×128 pixels. In practice, the size reduction of ROIs depends on the accuracy requirement of the object detection method and the architecture of the DNN model. In other words, the scaled size of the ROIs can be adjusted corresponding to the complexity of the DNN model and the accuracy requirements of the object detection method, which is not a limitation in the present invention.

Further, the one or more grayscale ROIs are processed by the DNN model to classify the objects contained in the one or more ROIs and to determine whether the objects contained in the one or more regions belong to a given categories.

More specifically, the DNN model involved in the present invention is constructed based on the depthwise separable convolution layers, wherein the depthwise separable convolution layer uses depthwise separable convolution in place of standard convolution to solve the problems of low computational efficiency and large parameter size. The depthwise separable convolution is a form of factorized convolution which factorize a standard convolution into a depthwise convolution and a 1×1 convolution called a pointwise convolution, wherein the depthwise convolution applies a single filter to each input channel and the pointwise convolution is used to create a linear combination the output of the depthwise convolution to obtain updated feature maps. In other words, each depthwise separable convolution layer comprises a depthwise convolution layer for applying a single filter to each input channel and a pointwise layer for linearly combining the outputs of the depthwise convolution layer to obtain a feature map.

The DNN model comprises N depthwise separable convolution layers, wherein the N is a positive integer and ranged from 4-12. In practice, the number of the depthwise separable convolution layers is determined by the requirements for latency and accuracy in specific scenarios. In particular, the DNN model may comprises five depthwise separable convolution layers when the object detection method is applied in the aforementioned security surveillance field. The five depthwise separable convolution layers are listed as first, second, third, fourth and fifth depthwise separable convolution layers, wherein the grayscale ROIs are inputted into the first depthwise separable convolution layer.

More detailedly, the first depthwise separable convolution layer comprises 32 filters of size 3×3 in the depthwise convolution layer and filters of size 1×1 in a corresponding number in the pointwise convolution layer. The second depthwise separable convolution layer connected to the first depthwise separable convolution layer comprises 64 filters of size 3×3 in the depthwise convolution layer and filters of size 1×1 in a corresponding number in the pointwise convolution layer. The third depthwise separable convolution layer connected to the second depthwise separable convolution layer comprises 128 filters of size 3×3 in the depthwise convolution layer and filters of size 1×1 in a corresponding number in the pointwise convolution layer. The fourth depthwise separable convolution layer connected to the third depthwise separable convolution layer comprises 256 filters of size 3×3 in the depthwise convolution layer and filters of size 1×1 in a corresponding number in the pointwise convolution layer. The five depthwise separable convolution layer connected to the fourth depthwise separable convolution layer comprises 256 filters of size 3×3 in the depthwise convolution layer and filters of size 1×1 in a corresponding number in the pointwise convolution layer After obtaining the feature maps of the grayscale ROIs by a predetermined number of depthwise separable convolution layers, the DNN model further classify the candidate objects contained in the grayscale ROIs and generate a classification result based on a determination of whether the objects contained in the ROIs belong to a given categories. In particular, the deed of classifying the candidate objects contained in the grayscale ROIs is accomplished by a Softmax layer of the DNN model.

In summary, the process of determining whether the objects contained in the one or more images belong to a given categories by processing the one or more images collected by the surveillance device to is illustrated.

Figure 2:
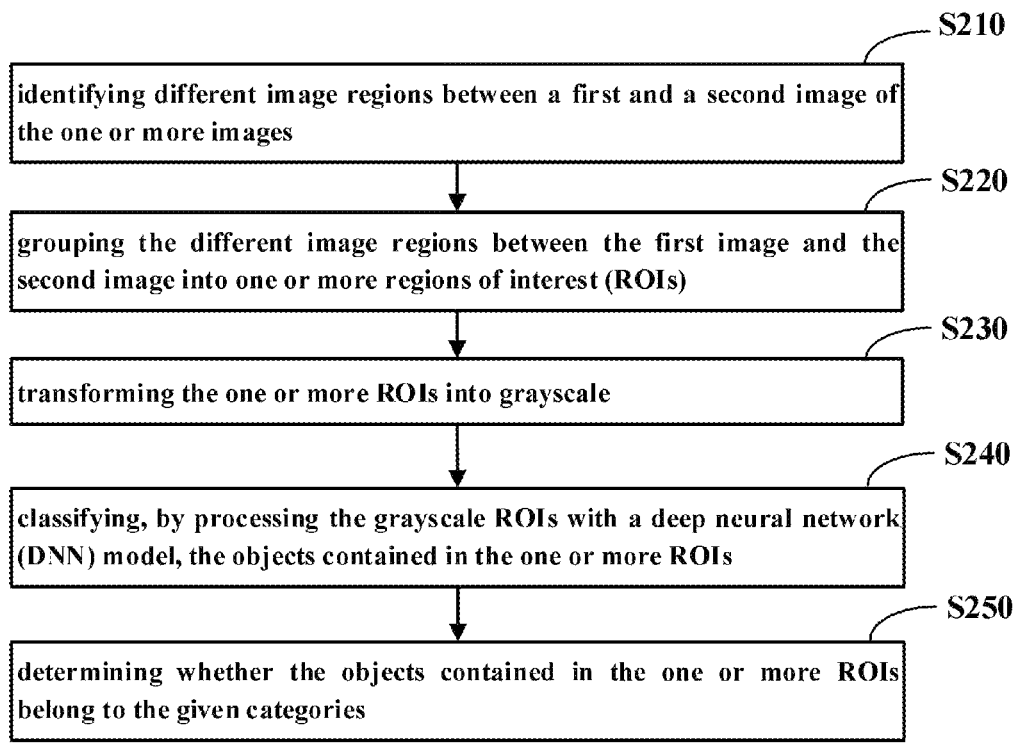
FIG. 2 is a flow diagram illustrating the one or more images being processed by a motion-based object detection method according to the above preferred embodiment of the present invention.

FIG. 2 is a flow diagram illustrating the one or more images being processed by the motion-based object detection method according to the above preferred embodiment of the present invention. As shown in the FIG. 2, the process of processing the one or more images with the motion-based object detection method comprises the steps of: S210, identifying different image regions between a first and a second image of the one or more images; S220, grouping the different image regions between the first image and the second image into one or more regions of interest (ROIs); S230, transforming the one or more ROIs into grayscale; S240, classifying, by processing the grayscale ROIs with a deep neural network (DNN) model, the objects contained in the one or more ROIs; and S250, determining whether the objects contained in the one or more ROIs belong to the given categories.

For ease of better description and understanding, the detection phrase conducted by the object detector is defined as an accurate detection phrase in the present invention. More specifically, when the video surveillance system is in the accurate detection phrase, the surveillance device is shifted to an operation mode where the video recording function is turned on temporarily to capture the one or more images of the moving object in the scene within the field of view of the surveillance device and then the one or more images are processed by the object detector with the motion-based object detection method to classify the objects in the one or more images and to determine whether the objects contained in the one or more images belong to a given categories. In other words, prior to turning on the video recording function of the surveillance device continuously, the video surveillance system undergo two gradually deepened detection phrase (the preliminary detection phrase and the accurate detection phrase) in such a manner to gradually filter false detection and alerts while reducing the power consumption of the surveillance device.

In step S140, the video recording function of the surveillance device is turned on continuously to video record the moving object in the field of view thereof in response to a positive determination that the objects contained in the one or more images belong to a given categories. In other words, when detecting that the objects contained in the one or more images are of the given categories, the surveillance device starts to video monitor the moving object within the field of view.

In one embodiment of the present invention, the given categories may be set as human beings. In other words, the function of the object detector is to detect whether the objects contained in the one or more images collected by the surveillance device belong to the human beings or not. Further, once the objects contained in the one or more images is verified as human beings, the video recording function of the surveillance device is triggered on continuously to video monitor the potential intruder in the field of view of the surveillance device. On the other hand, when the objects detected in the one or more images are not of the given categories (here the human beings), the surveillance device will return to the standby mode so as to effectively reduce the power consumption thereof.

In order to enhance the security, an alert is generated to notify the registered users of a potential intruder when the objects contained in the one or more images provided by the surveillance device are detected belonging to the given categories. Meanwhile, the video recorded by the surveillance device may be transmitted to a client system of the registered users synchronously, such that the registered users may remotely check the situations occurring in the areas that the surveillance device monitors on a display of the client system. It should be noted that the registered users in the present invention refer to the users who have the authority to receive the recorded videos and alert information from the surveillance device and an access to control the surveillance device remotely via the client system.

In the implementation, the alert information and/or the recorded video may be wirelessly transmitted to the client system (such as a smart phone) of the registered users via a Wi-Fi module communicatively connected with the surveillance device, such that the registered users may remotely monitor the areas where the surveillance is mounted. It is appreciated that the alert information and/or the recorded video may be firstly transmitted to a server (either a local server or a cloud server) for storage and then being sent to the client system of the registered users. Those who skilled in the art would easily understand that constructing a server as a transfer station for the recorded video is advantageous for the storage and management of the video data for preventing the recorded videos missing.

In addition, the registered users may control the surveillance device through the client system in hand. For example, the registered users may send a control signal to the surveillance device for selectively switching the surveillance device between the standby mode and the operation mode. It is worth mentioning that with the client system, the interaction between the registered users and the surveillance device is enhanced, such that the registered users are enabled to control the surveillance device or adjust parameters remotely and conveniently based on their own needs. In other words, the user experience of the video surveillance system is improved.

In order to further reduce the incidence of false detection and filter out unnecessary alerts, the object detector for detecting the objects contained in the one or more images may be intensively trained to be capable of recognizing particular objects in the given categories. Assuming the given categories be human beings as an example, the object detector after being intensively trained may be able to recognize the registered users and the objects authorized by the registered users, such as family members and friends of the registered users. As such, the video recording function of the surveillance device may be triggered on only when the objects contained in the one or more images are verified belonging to the particular objects of the given categories, such that unwanted false detections and alerts can be further filtered out. It is appreciated that the video surveillance system after being intensively trained becomes more relevant and useful for its customers.

It is worth mentioning that a new trained DNN model with the capability to recognize particular objects in the given categories could be reloaded in the object detector as well to fulfill the purpose of reducing the incidence of false detection and filtering out unnecessary alerts in practice.

In summary, the video surveillance method based on object detection according to the preferred and alternative mode of the embodiments is illustrated, wherein the method is capable of intelligently turning on the video surveillance function of a surveillance device based on a detection, performed by an object detector integrated in the surveillance device, of the objects contained in the images collected by the surveillance device belonging to a given categories, such that false detections and alerts are significantly filtered and the power-consumption thereof is reduced as well.

Illustrative Video Surveillance System Based on Object Detection

Figure 3:
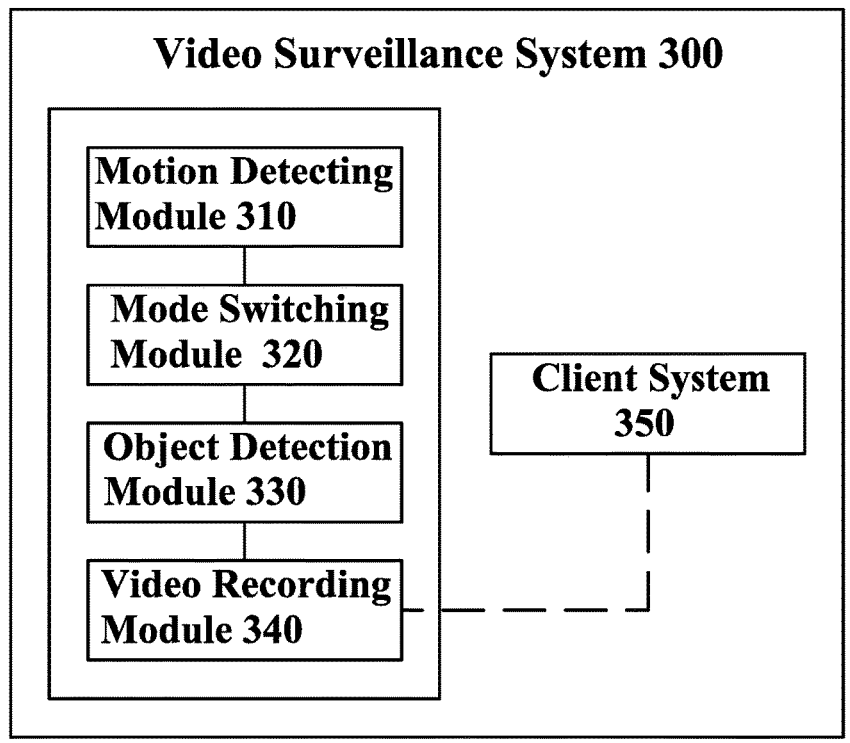
FIG. 3 is a block diagram of a video surveillance system based on object detection according to a preferred embodiment of the present invention.

FIG. 3 is a block diagram of a video surveillance system based on object detection according to a preferred embodiment of the present invention. As shown in the FIG. 3 of the drawings, the video surveillance system 300 comprises a motion detector 310 for detecting an object motion in the field of view of a surveillance device when the surveillance device is in a standby mode; a mode switcher 320 for switching, responsive to a positive detection, the surveillance device from the standby mode to an operation mode, wherein in the operation mode, one or more images of the moving object are generated by the surveillance device; an object detector 330 for processing the one or more images with deep neural network (DNN) model of an object detector to determine whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images; and a video recorder 340 for video recording, responsive to a positive determination, the moving object in the field of view of the surveillance device.

In one embodiment of the present invention, the video recorder 340 is further configured for generating an alert responsive to a positive determination In one embodiment of the present invention, wherein the object detector 330 is further configured for:

identifying different image regions between a first and a second image of the one or more images;

grouping the different image regions between the first image and the second image into one or more regions of interest (ROIs);

transforming the one or more ROIs into grayscale;

classifying, by processing the grayscale ROIs with a deep neural network (DNN) model, the objects contained in the one or more ROIs; and determining whether the objects contained in the one or more ROIs belong to a given categories.

In one embodiment of the present invention, the object detector 330 is further configured for, prior to identifying different image regions between a first and a second image of the one or more images, transforming the second image to compensate for the physical movement of the surveillance device when capturing the first image and the second image.

In one embodiment of the present invention, the video recorder 340 is further configured for outputting the recorded video.

In one embodiment of the present invention, the mode switcher 320 is further configured for receiving a control signal to selectively switch the surveillance device between the standby mode and the operation mode.

In one embodiment of the present invention, the DNN model of the object detector is further trained to recognize particular objects of the given categories, and the object detector 330 is further configured to determine whether the objects contained in the one or more images belong to particular objects of the given categories.

In one embodiment of the present invention, the given categories are set as human beings In one embodiment of the present invention, the video surveillance system further comprises a client system 350 for receiving the video recorded by the video recorder.

In one embodiment of the present invention, the client system 350 is capable of generating a control signal for selectively switching the surveillance device between the standby mode and the operation mode.

Those skilled in the art could easily understand that the functions and operations of the modules in the video surveillance system 300 have been detailedly illustrated in the aforementioned description of the objection detection method. Therefore, duplicate description is omitted.

It is worth mentioning that each module 310, 320, 330, 340 in the video surveillance system may be embodied as one separate software module or hardware module or even a combination thereof. Alternatively, multiple modules 310, 320, 330, 340 of the video surveillance system may be integrated into one separate software module or hardware module or even a combination thereof, which is not a limitation in the present invention.

Figure 4:
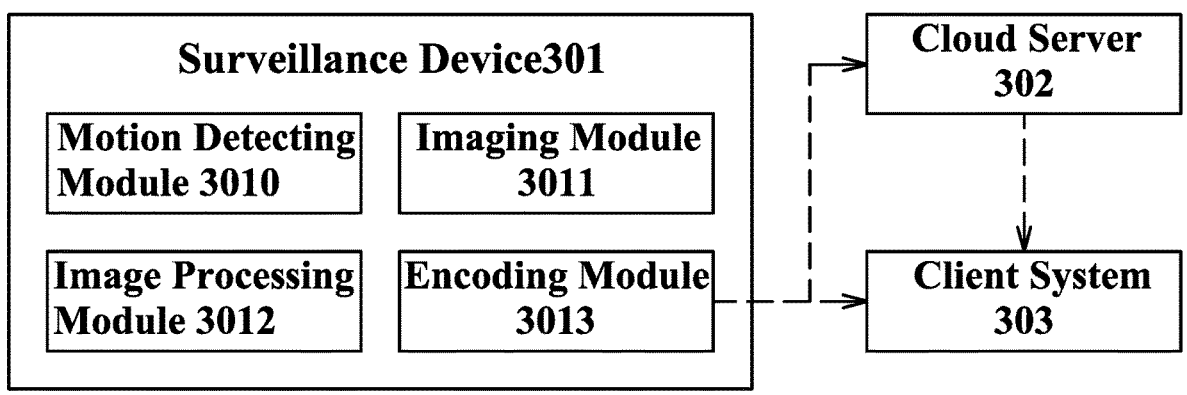
FIG. 4 illustrates an implementation of the video surveillance system according to the above preferred embodiment of the present invention.

FIG. 4 illustrates an implementation of the video surveillance system according to the above preferred embodiment of the present invention. As shown in the FIG. 4 of the drawings, the video surveillance system 300 in the implementation comprises a surveillance device 301, a cloud server 302, and a client system 303, wherein the surveillance device 301, the cloud server 302 and the client system 303 are communicatively connected with each other (i.e. via Wi-Fi).

As shown in the FIG. 4 of the drawings, the surveillance device 301 comprises a motion detector 3010, an imaging module 3011, an image processing module 3012 and an encoding module 3013. The motion detector 3010 of the surveillance device 301 is arranged for detecting an object motion in the field of view of the surveillance device 301 when the surveillance device 301 is in a standby mode. The imaging module 3011 is arranged for generating, responsive to a positive detection to switch the surveillance device 301 from the standby mode to an operation mode, one or more images of the moving object. The image processing module 3012 is arranged for determine, by processing the one or more images with a deep neural network (DNN) model of an object detector, whether the objects contained in the one or more images belong to a given categories. The encoding module 3013 is arranged for video recording, responsive to a positive determination, the moving object in the field of view of the surveillance device 301 and transmitting the recorded videos to the cloud server 302. Then, the recorded videos of the moving objects in the field of view of the surveillance device 301 and corresponding alerts can be transmitted to the client system 303 of the registered users by the cloud server 302, such that the registered users are able to remotely check the areas for which the surveillance device 301 is monitored.

On the other hand, the registered users may control the surveillance device 301 via the client system 303. In the implementation, the registered users may send a control signal to the surveillance device 301 via the client system 303, i.e. the control signal may be a live streaming request. Accordingly, the surveillance device 301 will enters a live streaming state where the encoding and the imaging modules 3011, 3013 of the surveillance device 301 are turned on in response to the live streaming request to video record the moving object in the field of the view of the surveillance device 301 and simultaneously the recorded videos are transmitted to the cloud sever 302, such that the registered users is able to real time viewing the surveillance device's field of view when the recorded videos are being continuously sent the client system 303. Alternatively, the control signal may be a live streaming stop request. In such case, the surveillance device 301 will go back to the standby state where the encoding and the imaging modules 3011, 3013 of the surveillance device 301 are turned off in response to the live streaming stop request.

It is worth mentioning that the function modules 3010, 3011, 3012, 3013 of the surveillance device 301 may be power managed by module to module and only necessary modules are turned on based on specific requirements of the video surveillance system 300. For example, all the modules 3011, 3012, and 3013 expect the motion detector 3010 can be in a standby mode to reduce the power consumption of the surveillance device 301 when it is in its standby mode. while in its operation module, the imaging module 3011 and the image processing module 3012 of the surveillance device 301 are waken up to capture one or more images of the moving object via the imaging module 3011 and to detect whether the objects contained in the one or more images belong to a given categories via the image processing module 3012. Further, the encoding module 3013 is activated in response to a positive determination for video recording and transmission. In this way, the power consumption of the surveillance device can be effectively reduced.

Figure 5:
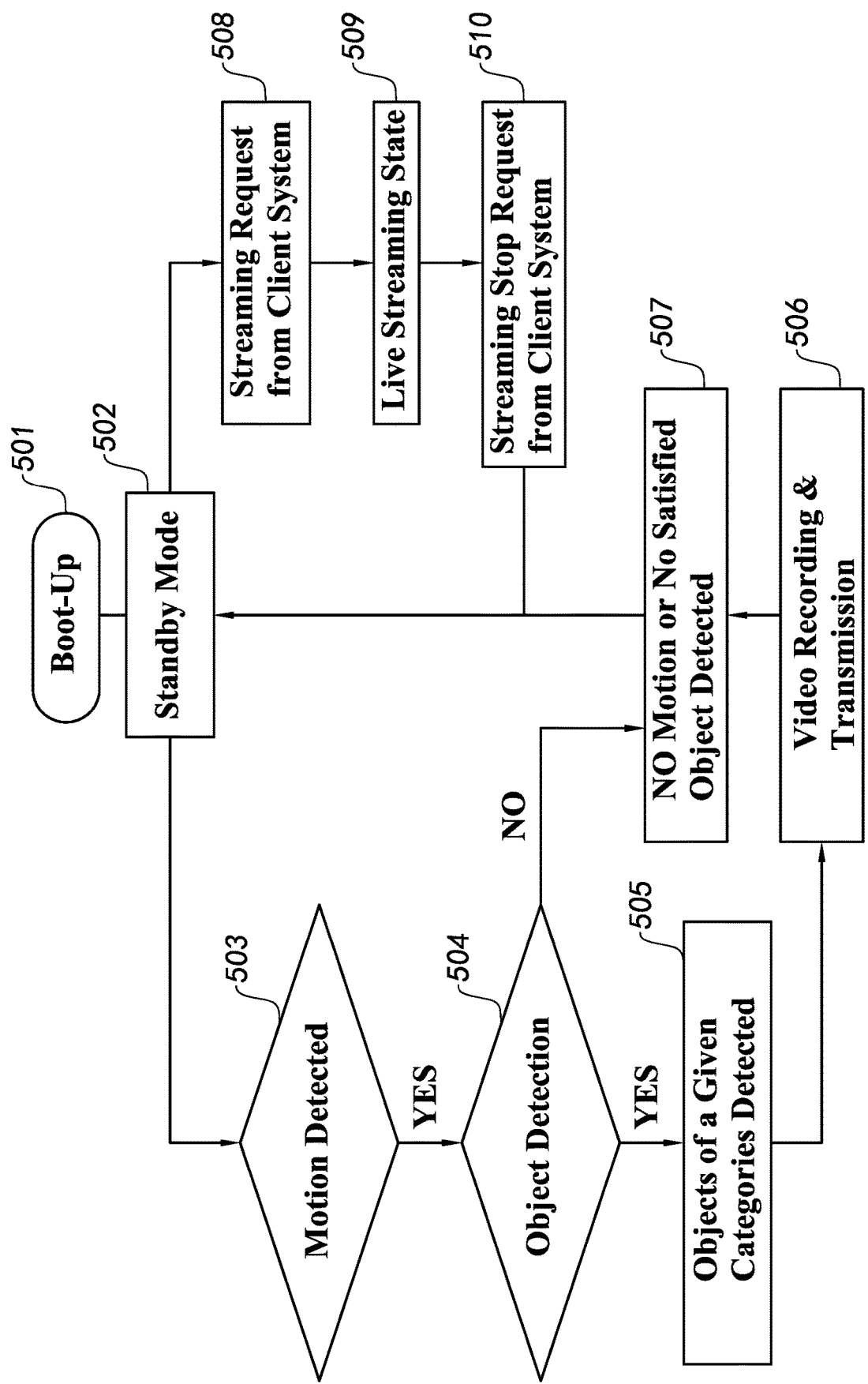
FIG. 5 is a logic flow diagram illustrating how the implementation of the video surveillance system performs according to the above preferred embodiment of the present invention.

FIG. 5 is a logic flow diagram illustrating the implementation of the video surveillance system 300. As shown in the FIG. 5 of the drawings, the video surveillance system's logic flow starts with boot-up stage 501 controlled by the client system 303, and then enters the first logic block of 502, where the surveillance device is in a low power standby mode with most of the functional modules 3011, 3012, 3013 turned off and only the motion detector 3010 turned on. In process 503, when an object motion is detected, the state of the surveillance device 301 will enter the operation mode to detect whether the objects contained in the one or more images belong to a given categories.

If there is no satisfied object detected, the state of the surveillance device 301 will go through process 507 to go back to the standby mode from the operation mode. However, if there is satisfied object detected in the process 505, the state of the surveillance device 301 will enter into the video recording and transmission state 506. This is the highest power consumption state of the surveillance device 301 where the recorded video is subsequently being transmitted to the cloud server.

As shown in the FIG. 5 of the drawings, when the surveillance device 301 is in the standby mode, the registered users may control the states of the surveillance device 301 via the client system 303. In the implementation, the registered users may send a control signal to the surveillance device 301 via the client system 303, i.e. the control signal may be a live streaming request. Accordingly, the surveillance device 301 will enters a live streaming state 510 where the encoding and the imaging modules 3011, 3013 of the surveillance device 301 are turned on in response to the live streaming request (logic block 508) to video record the moving object in the field of the view of the surveillance device 301 and simultaneously the recorded videos are transmitted to the cloud sever 302, such that the registered users is able to real time viewing the surveillance device's field of view when the recorded videos are being continuously sent to the client system 303. Alternatively, the control signal may be a live streaming stop request (logic block 509). In such case, the surveillance device 301 will go back to the standby state where the encoding and the imaging modules 3011, 3013 of the surveillance device 301 are turned off in response to the live streaming stop request.

It is worth mentioning that one important aspect of present invention is that it provides an end-to-end system from surveillance device to client system for the registered users to ensure the best use experience in the object-triggered video surveillance system.

Illustrative Computer Program Product

The present invention may be an apparatus, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, devices, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of devices, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A video surveillance method based on object detection, comprising the steps of:
   detecting, by a motion detector, an object motion, in the field of view of a surveillance device when the surveillance device is in a standby mode, wherein the object detector is integrated in the surveillance device;

generating, responsive to a positive detection to switch the surveillance device from the standby mode to an operation mode, one or more images of the moving object;

determining, by processing the one or more images with a deep neural network (DNN) model of an object detector, whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images;

video recording, responsive to a positive determination, the moving object in the field of view of the surveillance device; and generating an alert responsive to a positive determination;

wherein the step of determining whether the objects contained in the one or more images belong to a given categories; comprises the steps of:

identifying different image regions between a first and a second image of the one or more images;

grouping the different image regions between the first image and the second image into one or more regions of interest (ROIs);

transforming the one or more ROIs into grayscale;

classifying, by processing the grayscale ROIs with a deep neural network (DNN) model, the objects contained in the one or more ROIs; and determining whether the objects contained in the one or more ROIs belong to the given categories.

2. The video surveillance method, as recited in claim 1, wherein prior to identifying different image regions between a first and a second image of the one or more images, the method further comprises a step of transforming the second image to compensate for the physical movement of the surveillance device when capturing the first image and the second image.

3. The video surveillance method, as recited in claim 2, further comprising a step of outputting the recorded video.

4. The video surveillance method, as recited in claim 3, further comprising a step of receiving a control signal to selectively switch the surveillance device between the standby mode and the operation mode.

5. A video surveillance system based on object detection, comprising:

a motion detector configured to detect an object motion in the field of view of a surveillance device when the surveillance device is in a standby mode;

a mode switcher configured to switch, responsive to a positive detection, the surveillance device from the standby mode to an operation mode, wherein in the operation mode, one or more images of the moving object are generated by the surveillance device;

an object detector configured to process the one or more images with deep neural network (DNN) model of an object detector to determine whether the objects contained in the one or more images belong to a given categories, wherein the DNN model comprises N (N is a positive integer and ranged from 4-12) depthwise separable convolution layers, wherein each depthwise separable convolution layer comprises a depthwise convolution layer for applying a single filter to each input channel and a pointwise layer for linearly combining the outputs of the depthwise convolution layer to obtain feature maps of the one or more images; and a video recorder configured to video record, responsive to a positive determination, the moving object in the field of view of the surveillance device, wherein the video recorder is further configured to generate an alert responsive to a positive determination;

wherein the object detector is further configured to:

identify different image regions between a first and a second image of the one or more images;

group the different image regions between the first image and the second image into one or more regions of interest (ROIs);

transform the one or more ROIs into grayscale;

classify, by processing the grayscale ROIs with a deep neural network (DNN) model, the objects contained in the one or more ROIs; and determine whether the objects contained in the one or more ROIs belong to a given categories.

6. The video surveillance system, as recited in claim 5, wherein the object detector is further configured to, prior to identifying different image regions between a first and a second image of the one or more images, transform the second image to compensate for the physical movement of the surveillance device when capturing the first image and the second image.

7. The video surveillance system, as recited in claim 6, wherein the video recorder is further configured to output the recorded video.

8. The video surveillance system, as recited in claim 7, wherein the mode switcher is further configured to receive a control signal to selectively switch the surveillance device between the standby mode and the operation mode.

9. The video surveillance system, as recited in claim 7, wherein the object detector is further configured to:

determine whether the objects contained in the one or more images belong to particular objects of the given categories, wherein the DNN model of the object detector is trained to recognize particular objects of the given categories.

10. The video surveillance system, as recited in claim 9, wherein the given categories are set as human beings.

11. The video surveillance system, as recited in claim 10, further comprising a client system configured to receive the recorded video.

12. The video surveillance system, as recited in claim 11, wherein the client system is capable of generating a control signal for selectively switching the surveillance device between the standby mode and the operation mode.

* * * * *